United States Patent
Mintz et al.

(10) Patent No.: US 8,280,803 B2
(45) Date of Patent: *Oct. 2, 2012

(54) SYSTEM AND METHOD FOR PROVIDING A LINEAR SPREAD

(75) Inventors: Sagy P. Mintz, Lincolnshire, IL (US); Michael J. Burns, Riverside, IL (US)

(73) Assignee: Trading Technologies International Inc., Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/239,972

(22) Filed: Sep. 22, 2011

(65) Prior Publication Data

US 2012/0011053 A1    Jan. 12, 2012

Related U.S. Application Data

(63) Continuation of application No. 12/501,951, filed on Jul. 13, 2009, now Pat. No. 8,051,001, which is a continuation of application No. 11/483,064, filed on Jul. 7, 2006, now Pat. No. 7,577,608.

(51) Int. Cl.
   *G06Q 40/00* (2012.01)
(52) U.S. Cl. ........................ 705/37; 705/36 R
(58) Field of Classification Search ................ 705/36 R, 705/37

See application file for complete search history.

(56) References Cited

U.S. PATENT DOCUMENTS

| | | | |
|---|---|---|---|
| 6,772,132 B1 | 8/2004 | Kemp, II et al. | |
| 7,127,424 B2 | 10/2006 | Kemp, II et al. | |
| 7,243,083 B2 | 7/2007 | Burns et al. | |
| 7,389,268 B1 | 6/2008 | Kemp, II et al. | |
| 7,437,325 B2 | 10/2008 | Kemp, II et al. | |
| 7,593,887 B2 | 9/2009 | Duquette | |
| 7,904,370 B2 | 3/2011 | Singer et al. | |
| 2006/0129470 A1 | 6/2006 | Brendgen | |
| 2006/0265320 A1 | 11/2006 | Duquette | |
| 2007/0005481 A1 | 1/2007 | Kedia et al. | |

OTHER PUBLICATIONS

U.S. Appl. No. 12/501,951, filed Jul. 13, 2009, Mintz et al.

*Primary Examiner* — Jagdish Patel
*Assistant Examiner* — Sara C Hamilton
(74) *Attorney, Agent, or Firm* — McDonnell Boehnen Hulbert & Berghoff LLP

(57) ABSTRACT

A system and method for providing a linear spread in an electronic trading environment are described. According to one example embodiment, a trading system can receive market information associated to a trading strategy, known as a spread. The trader may also define a market volatility parameter to utilize in the calculation of a linear spread price axis. The received market information and a divide spread algorithm are also used to determine the linear spread price axis. The trading application determines a linear spread price axis, at which price levels are separated by consistent linear tick increments. The linear spread price axis allows for more efficient and effective trading in the electronic trading environment especially when certain tradeable objects are traded or when certain spread algorithms, like the divide spread algorithm, are utilized.

18 Claims, 6 Drawing Sheets

SYSTEM AND METHOD FOR PROVIDING A LINEAR SPREAD

CROSS-REFERENCE TO RELATED APPLICATIONS

This application is a continuation of U.S. patent application Ser. No. 12/501,951 filed Jul. 13, 2009, now U.S. Pat. No. 8,051,001, which is a continuation of U.S. patent application Ser. No. 11/483,064 filed Jul. 7, 2006, now U.S. Pat. No. 7,577,608, the contents of which are fully incorporated herein by reference.

FIELD OF INVENTION

The present invention is directed towards a method of providing a linear price axis for a trading strategy in an electronic trading environment.

BACKGROUND

In recent years, a trend towards electronic trading has become well-established, causing one major exchange after another to replace or at least supplement the traditional open outcry where a trade is done face to face, with electronic systems which automatically match bids and offers. While the motivation behind using electronic trading may vary from market to market, greater efficiency and volume are some of the considerations.

In particular, subscribing traders are connected to an exchange's electronic trading platform by way of a communication link and through an application program interface to facilitate real-time electronic messaging between themselves and the exchange. The electronic messaging includes market information that is sent from the electronic exchange to the traders. Market information may include data that represents just the inside market. The inside market is the lowest sell price (best or lowest ask) and the highest buy price (best or highest bid) at a particular point in time. Market information may also include market depth. Market depth refers to quantities available at the inside market and can also refer to quantities available at other prices away from the inside market. Additionally, the electronic exchange can offer other types of market information such as the last traded price ("LTP"), or the last traded quantity ("LTQ").

Regardless of how the communication link is established, the client device provides a way for a trader to participate in the electronic market. Generally, each client device uses software that creates specialized interactive trading screens. The trading screens enable the traders to enter and execute orders, obtain market quotes, and monitor positions for one or more tradeable objects while implementing various trading strategies including those previously used on the floor of an open-outcry exchange.

As used herein, the term "tradeable object" refers to anything that can be traded with a quantity and price. For example, tradeable objects may include, but are not limited to, all types of traded financial products, such as, for example, stocks, options, bonds, futures, currency, and warrants, as well as funds, derivatives, and collections of the foregoing. Moreover, tradeable objects may include all types of commodities, such as grains, energy, and metals. Also, a tradeable object may be "real," such as products that are listed by an exchange for trading, or "synthetic," such as a combination of real products that is created by the trader (e.g. spread). A tradeable object could also be a combination of other tradeable objects, such as a class of tradeable objects or a trading strategy.

Trading strategies incorporated into electronic trading can improve among other things, the speed, accuracy, and ultimately the profitability of trading electronically. One such trading strategy is spread trading. Spread trading is the buying and/or selling of two or more tradeable objects, the purpose of which is to capitalize on changes or movements in the relationships between the tradeable objects. Each tradeable object of the spread can also be referred to as a "leg" of the spread. A spread trade could involve buying in two or more legs, buying and selling in two or more legs, selling in two or more legs or some combination thereof. Often, the tradeable objects being spread are real contracts for different delivery months (expiration dates) of the same tradeable object or contracts of the same tradeable object at different strike prices, but sometimes involve different real tradeable objects or the same tradeable object on different exchanges.

There are a variety of different algorithms that can be used to spread trade. To generate spread prices, one conventional spread algorithm calls for summing certain prices from each of the legs, where buying a leg is positive and selling a leg is negative. For instance, assume that a trader is interested in buying a first leg and selling a second leg. To generate prices in this example, a computer processor takes certain prices from the first leg and subtracts certain prices from the second leg. However, the use of addition and subtraction is ineffective for spread trading currencies and energy tradeable objects because of the format the currency and energy tradeable objects are established in. Currencies, for instance, are traded as ratios to begin with, so performing a summing calculation does not produce an accurate or usable price for the resulting spread.

Therefore, a spread algorithm known as the divide spread (or ratio spread) algorithm is used to trade currency and energy, or other similar tradeable objects. When using the divide spread algorithm, a computer processor calculates the spread prices by dividing certain prices in the first leg by certain prices in the second leg. So, for instance, using the divide spread algorithm, spreading currency tradeable objects known as "USD/Euro" and "USD/Yen" results in a spread of "Euro/Yen." Using the divide spread algorithm, the resulting spread is tradeable, whereas the conventional algorithm of summation would have produced an unusable spread.

An electronic exchange may offer spread products like "Euro/Yen." However, there are times when generating a spread independently (a synthetic tradeable object) yields a better price for the spread than the exchange provided spread (a real tradeable object). Thus, a trader may find using a divide spread algorithm beneficial because it presents opportunities for the trader to make a profit trading the spread. A commercially available trading application that allows traders to generate and electronically trade spreads is Auto Spreader™ from Trading Technologies International, Inc. Portions of the AutoSpreader™ style display can be found in U.S. patent application Ser. No. 10/137,979, entitled, "System and Method for Performing Automatic Spread Trading," filed on May 3, 2002, incorporated herein by reference. Moreover, the generation and display of a spread along an axis is disclosed in U.S. patent application Ser. No. 09/880,078, entitled, "Electronic Spread Trading Tool," filed on Jun. 14, 2001, the contents of which are also incorporated herein by reference. These tools advantageously display a spread against an axis of prices for a more intuitive view of the spread market. As a result, traders often times prefer to display a spread against an axis.

According to the conventional algorithm of summation, the trading system can calculate a linear price axis for the spread using the prices from each of the legs. The spread price axis which results from the calculation of such a spread, is a linear scaled price axis with prices at consistent tick increments. Using the linear price axis, the trader can then easily distinguish the incremental price levels on the prices axis as well as place orders at the calculated spread prices displayed on the price axis.

However, using the divide spread algorithm, the resulting price axis is often non-linear and non-scaled with inconsistent prices increments. The resulting price axis can be almost incomprehensible and impractical for a trader to use for electronic trading.

It is therefore, beneficial to provide a trading screen that offers a linear spread price axis for a trading strategy in an electronic trading environment.

SUMMARY

To address these and other objectives, the example embodiments comprise a method for providing a linear price axis when spread trading certain tradeable objects or using certain spread trading algorithms that would normally result in a non-linear spread axis. The method includes defining a trading strategy of a plurality of tradeable objects, and defining a market volatility parameter corresponding to the tradeable objects. A linear price axis for the spread is generated using the market volatility parameter and the market information for the tradeable objects. Market information for the spread can be mapped to the linear price axis.

The example embodiments described herein are adaptable to a wide variety of trading applications that produce graphical user interfaces to trade in an electronic trading environment.

Additional features and advantages of the example embodiment will be set forth in the description that follows. The features and advantages of the example embodiment may be realized and obtained through the embodiments particularly pointed out in the appended claims. These and other features of the present embodiment will become more fully apparent from the following description and appended claims, or may be learned by the practice of the example embodiments as set forth hereinafter.

BRIEF DESCRIPTION OF DRAWINGS

Example embodiments are described herein with reference to the following drawings, in which.

DETAILED DESCRIPTION OF EXAMPLE EMBODIMENTS

I. Overview

Figure 1:
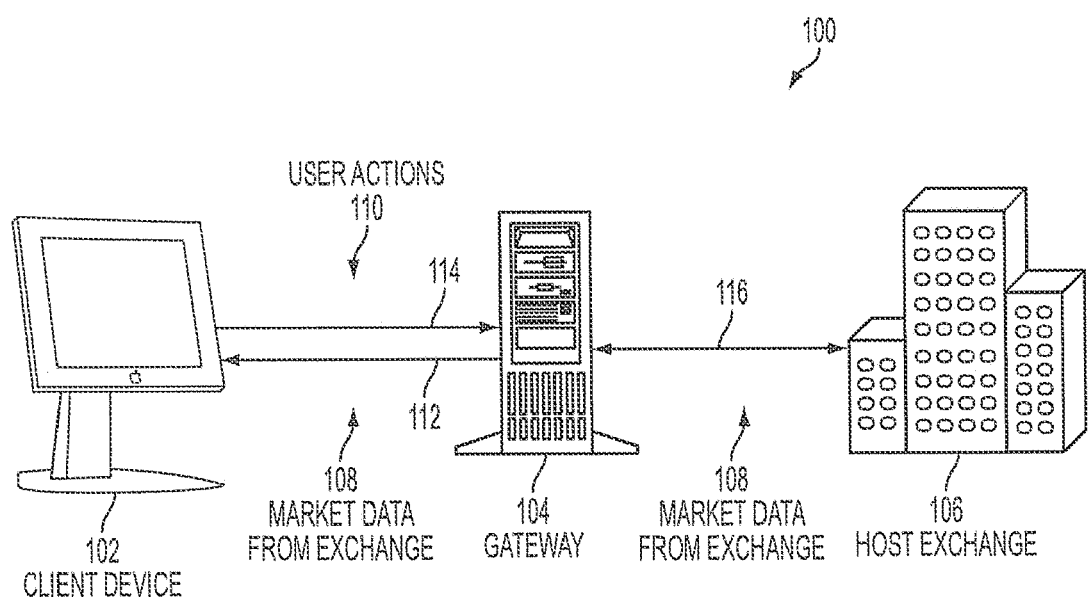
FIG. 1 is a block diagram illustrating an example network configuration for a communication system utilized to access one or more electronic exchanges.

A system and method for determining a linear price axis for a trading strategy in an electronic trading environment are provided. The example embodiments are particularly useful when spread trading certain tradeable objects or using certain spread trading algorithms that would normally result in a non-linear spread axis. The divide spread algorithm is one example of a trading strategy that would normally result in a non-linear spread axis using conventional trading tools. As such, the divide spread algorithm is utilized to illustrate the example embodiments; however, one of ordinary skill will recognize that the present invention is not so limited. Rather, the example embodiments may be utilized for any trading strategy that for one reason or another is difficult to trade due to non-linear tick increments.

According to the example embodiments, when using divide spreads, the otherwise non-linear spread price axis is made linear for the ease of use for a trader. As will be discussed in greater detail below, to determine a linear price axis, the trading system uses, among other things, available market information associated with the legs and a market volatility parameter, which is an estimate based on how much each leg market will fluctuate around a price, such as the last traded price. Using this information the trading system can determine a tick increment for the spread price axis. Then, using the tick increment the trading system may create the entire spread price axis and display it in a linear, intuitive, and comprehensible format to the trader. Using the linear and scaled price axis, the trader may be able to place orders for the spread with ease and without confusion about prices and price level differences.

Additionally, as will be described in greater detail below, a trader can change the tick increments and the number of prices levels displayed on the trading screen by adjusting the user-defined market volatility parameters, manually overriding other calculated prices, or by using different prices in the legs. In such an embodiment, linear spread price axis will be dynamically recalculated based on the modified prices.

While the example embodiments are described herein with reference to illustrative embodiments for particular applications, it should be understood that the example embodiments are not limited thereto. Other systems, methods, and advantages of the present invention will be or become apparent to one with skill in the art upon examination of the following drawings and description. It is intended that all such additional systems, methods, features, and advantages be within the scope of the present invention, and be protected by the accompanying claims.

II. Hardware and Software Overview

As will be appreciated by one of ordinary skill in the art, the example embodiments may be operated in an entirely software embodiment, in an entirely hardware embodiment, or in a combination thereof. However, for sake of illustration, the example embodiments are described in a software-based embodiment, which is executed on a computer device. As such, the example embodiments take the form of a computer program product that is stored on a computer readable storage medium and the program code is executed by a suitable instruction system (e.g. a processor) in the computer device. Any suitable computer readable medium may be utilized including hard disks, CD-ROMs, optical storage devices, or magnetic storage devices, for example.

FIG. 1 is a block diagram illustrating an example system 100 that can be used to facilitate communication between an electronic exchange and a client device. The system 100 includes a client device 102, gateway 104, and host exchange 106. System 100 also includes a plurality of communication links 112, 114, and 116 between the client device 102, gateway 104, and host exchange 106. While FIG. 1 shows two connections between the client device 102 and the gateway 104, it should be understood that a single connection could be used as well. Similarly, one connection could exist between the gateway 104 and the host exchange 106. During a trading session, market data 108, in the form of messages, may be relayed from the host exchange 106 over the communication links 116 and 112 to the client device. As illustrated in FIG. 1, intermediate devices, such as gateway(s) 104, may be used to facilitate communications between the client device 102 and the host exchange 106. It should be understood that while FIG. 1 illustrates the client device 102 communicating with a single host exchange 106, in an alternative embodiment, the client device 102 could establish trading sessions to more than one host exchange.

The market data 108 contains information that characterizes the tradeable object's order book including, among other parameters, order related parameters, such as price and quantity, and the inside market, which represents the lowest sell price (also referred to as the best or lowest ask price), and the highest buy price (also referred to as the best or highest bid price). In some electronic markets, market data may also include market depth, which generally refers to quantities available for trading the tradeable object at certain buy price levels and quantities available for trading the tradeable object at certain sell price levels.

In addition to providing the tradeable object's order book information, electronic exchanges can offer different types of market information such as total traded quantity for each price level, opening price, last traded price, last traded quantity, closing price, or order fill information. It should be understood that market information provided from an electronic exchange could include more or fewer items depending on the type of tradeable object or the type of exchange. Also, it should be understood that the messages provided in the market data 108 may vary in size depending on the content carried by them, and the software at the receiving end may be programmed to understand the messages and to act out certain operations.

A trader may view the information provided from an exchange via one or more specialized trading screens created by software running on the client device 102. Upon viewing the market information or a portion thereof, a trader may wish to take actions, such as send orders to an exchange, cancel orders at the exchange, or change order parameters, for example. To do so, the trader may input various commands or signals into the client device 102. Upon receiving one or more commands or signals from the trader, the client device 102 may generate messages that reflect the actions taken, generally shown at 110. It should be understood that different types of messages or order types can be submitted to the host exchange 106, all of which may be considered various types of transaction information. Once generated, user action messages 110 may be sent from the client device 102 to the host exchange over communication links 114 and 116.

The range and quality of features available to the trader on his or her trading screen varies according to the specific software application being run. In addition to or in place of the interactive trading screens, the client device 102 may run automated non-interactive types of trading applications.

A commercially available trading application that allows a user to trade in environments like those shown in FIG. 1 and subsequent figures is X_TRADER® from Trading Technologies International, Inc. of Chicago, Ill. X_TRADER° also provides an electronic trading interface, referred to as MD Trader™, in which orders and bid/ask quantities are displayed in association with a static price axis. Portions of the X_TRADER® and the MD Trader™-style interface are described in U.S. Pat. No. 6,772,132 entitled "Click Based Trading With Intuitive Grid Display of Market Depth," filed on Jun. 9, 2000, U.S. patent application Ser. No. 09/971,087, entitled "Click Based Trading With Intuitive Grid Display of Market Depth and Price Consolidation," filed on Oct. 5, 2001, and U.S. patent application Ser. No. 10/125,894, entitled "Trading Tools for Electronic Trading," filed on Apr. 19, 2002, the contents of each are incorporated herein by reference.

Figure 2:
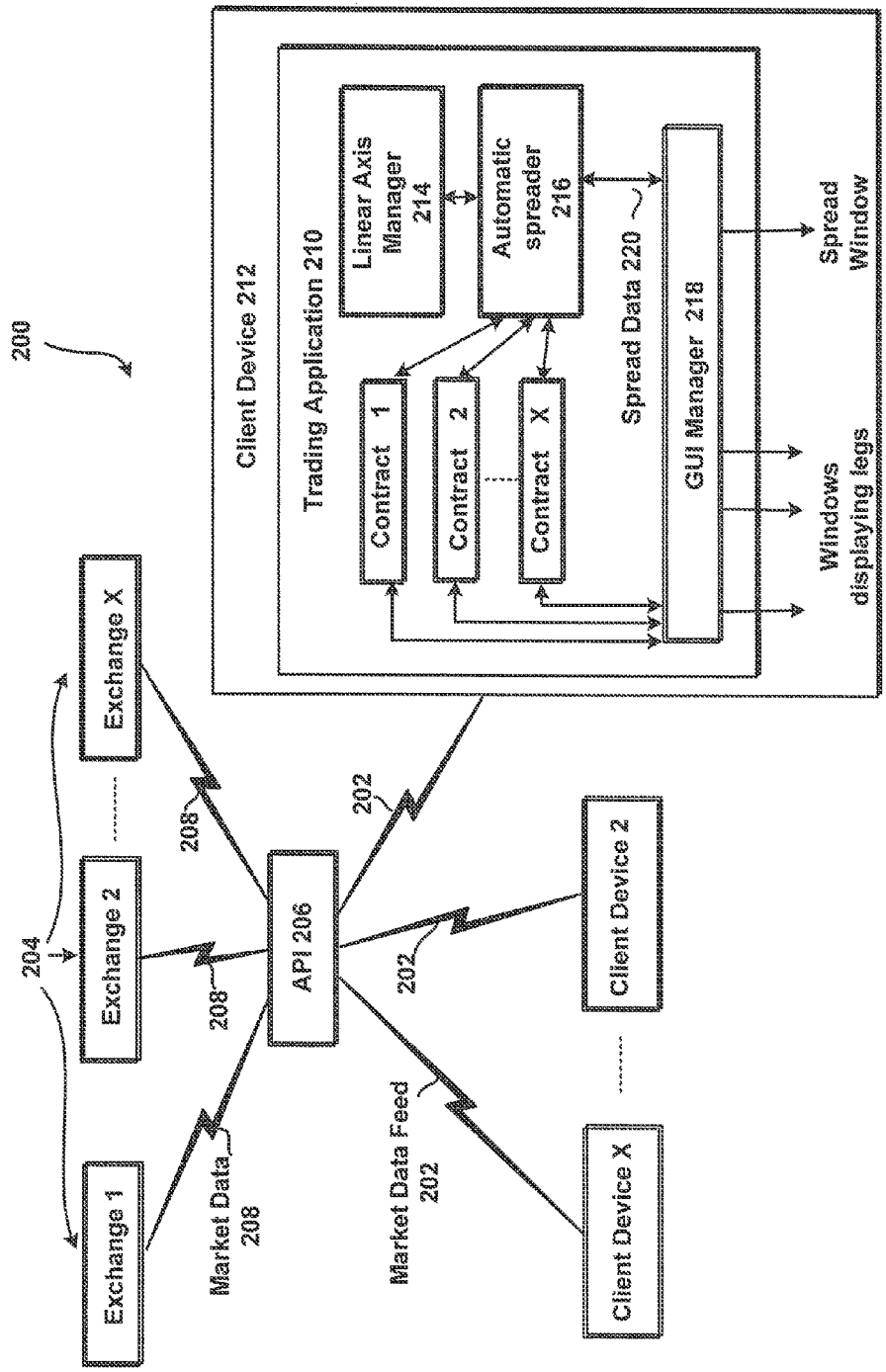
FIG. 2 is a block diagram illustrating a system for facilitating the automatic trading of spreads over the example network shown in FIG. 1 according to an example embodiment.

FIG. 2 is a block diagram illustrating an example system 200 for facilitating the automatic trading of spreads in accordance with the example embodiments. The system 200 includes an applications program interface ("API") 206 that translates market data 208 for one or more tradeable objects to an appropriate data format, referred to as market data feed(s) 202, which are communicated between the different exchanges and trading applications hosted on the client devices. Client devices may be computing devices such as personal computers, laptop computers, hand-held devices, and so forth. Although it is not necessary, the system 200 is configured to support a plurality of exchanges and client devices.

For purposes of illustration, an example client device 212 is shown in more detail to illustrate the interaction between its software and/or hardware components. The client device 212 executes program code, which includes a trading application 210, a linear axis manager 214, an automatic spreader 216, and a GUI manager 218. While only four components of program code are shown in the figure with respect to the client device 212, it is understood that the client device 212 could include additional components as well, and it is also understood that two or more components can be combined into one larger component. While client device 212 hosts and executes the program code in accordance with the example embodiment shown in FIG. 2, other terminals or devices can execute various aspects of the program code. For instance, a gateway device or server may host and execute aspects of the program code.

In general, as shown in FIG. 2, market data feeds 202 (for tradeable objects) are communicated from the API 206 to the trading application 210 where they are stored and continuously updated (or periodically updated). Using some or all of the market data feeds and the spread setting parameters, the automatic spreader 216 along with the linear axis manager 214 generates spread data 220. The spread data 220 preferably includes spread price and spread market depth, but may alternatively include other items of interest to the user such as the last traded price (LTP) and the last traded quantity (LTQ) for a spread.

The linear axis manager 214 represents program code that produces a linear axis of prices in those situations when spread trading certain tradeable objects or using certain spread trading algorithms that would normally result in a non-linear spread axis. The spread data 220 is communicated to the GUI manager 218 where it can be displayed in a spread window and traded. The GUI manager 218 is a software application, as shown in FIG. 2, but preferably may work with hardware components such as an input device like a mouse, keyboard, or touch screen, and an output device like a monitor, for example.

Figure 3:
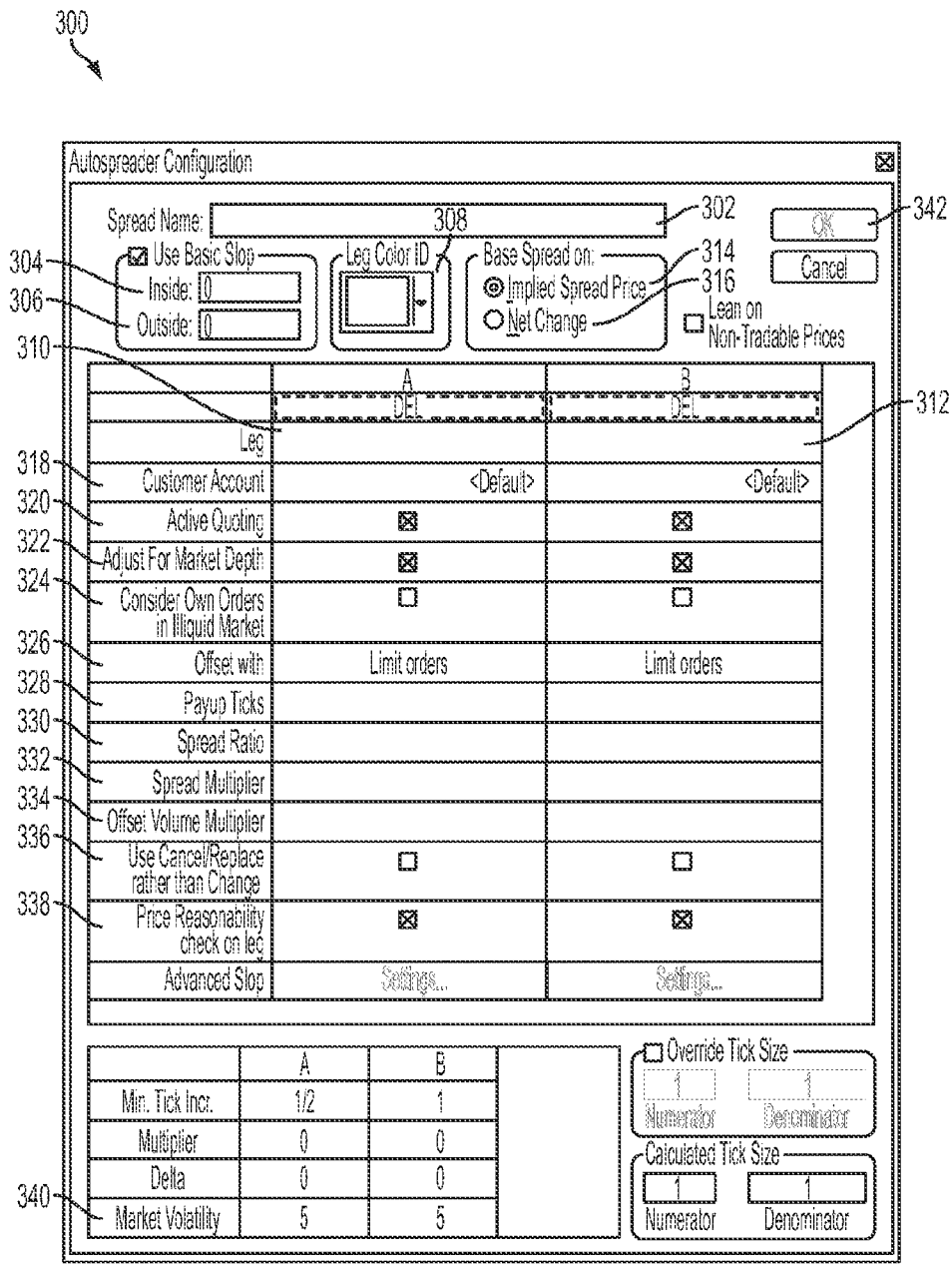
FIG. 3 is a block diagram illustrating an example spread configuration window utilized in accordance with the example system shown in FIG. 2.

FIG. 3 is a block diagram illustrating an example spread configuration window 300 that can be used to configure spread parameters for trading spreads. The spread configuration window 300 includes two individual legs 310 and 312 respectively, although any number of legs may be added to a spread. In one example embodiment, the spread configuration window 300 includes many spread parameters that can be set by a trader to customize the spread data feed. As such, the spread parameters may control the behavior of the spread as it is generated and/or displayed and/or traded, depending on the particular parameter.

An example list of spread parameters is provided here. The "Spread Name" 302 provides the name of the spread and/or the names of the underlying tradeable objects. Moreover, the names of the legs are displayed in the "Leg" fields 310 and 312. Alternatively, a trader can personalize the spread by renaming the spread and/or legs to have any desired name. Other parameters include "Inside Slop" 304, "Outside Slop" 306, "Leg Color ID" 308, "Implied Spread Price" 314, "Net Change" 316, "Customer Account" 318, "Active Quoting" 320, "Adjust for Market Depth" 322, "Consider Own Orders in Illiquid Market" 324, "Offset with" 326, "Payup Ticks" 328, "Spread Ratio" 330, "Spread Multiplier" 332, "Offset Volume Multiplier" 334, "Use Cancel/Replace rather than Change" 336, "Price Reasonability check on leg" 338, and "Market Volatility" 340. A trader may select "OK" 342 when the spread has been configured to open a spread window and individual leg windows. It will be appreciated by those skilled in the art that the parameters above may be flexible and/or change as circumstances dictate because of the wide range of products that can be traded using the automatic spreader. Moreover, the columns of the spread configuration window 300 can be dragged and dropped such that the user can re-arrange the order of the legs, or even add or delete legs.

III. Determining a Linear Price Axis

Figure 4:
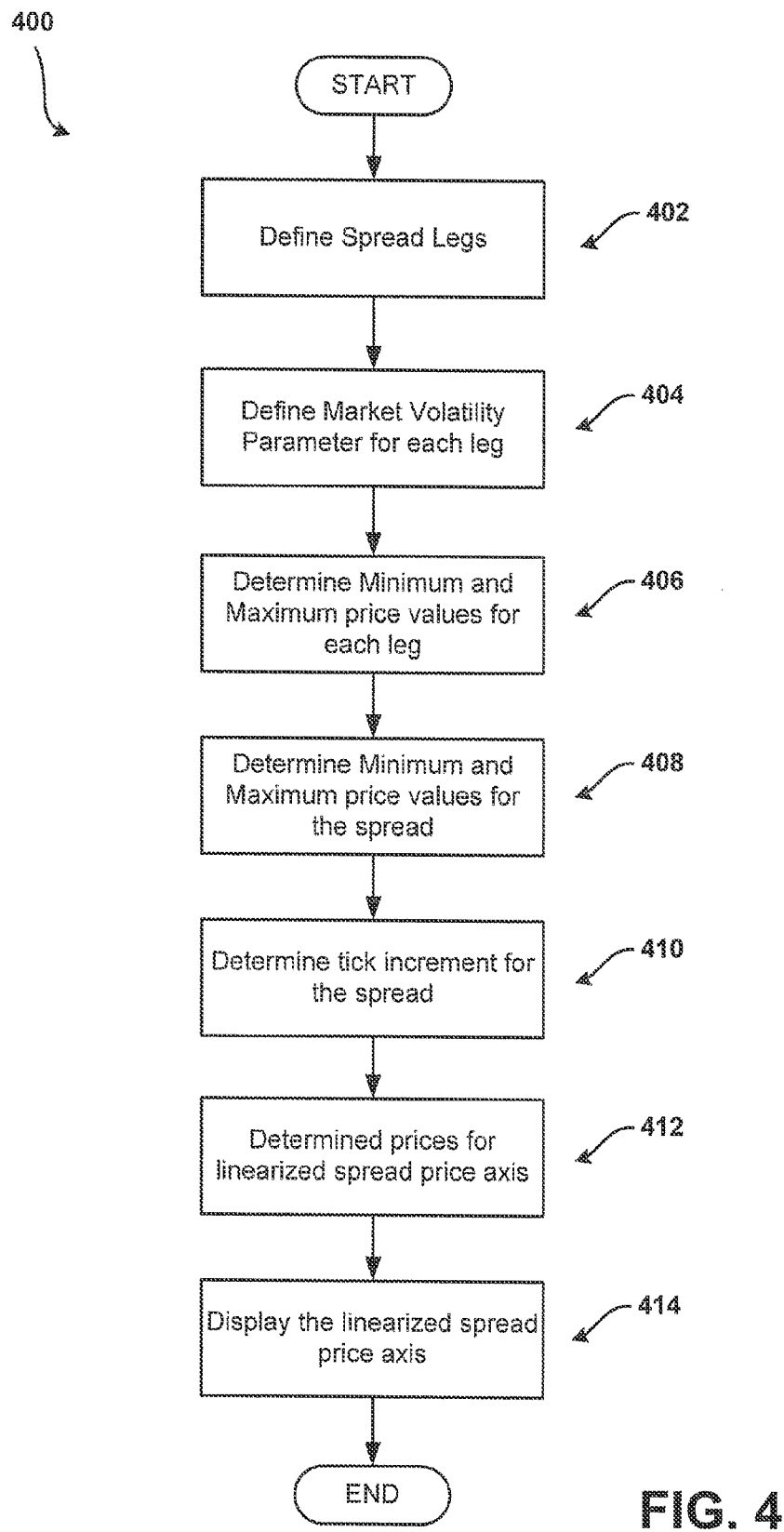
FIG. 4 is a flow chart illustrating an example method for providing a linear price axis in accordance with the example embodiments.

FIG. 4 is a flow chart illustrating an example method 400 for providing a linear price axis for a trading strategy, and particularly for a spread. The method 400 will be described in relation to the system illustrated in FIG. 2 and the spread configuration window shown in FIG. 3. Also, it should be understood that the flow chart only shows the functionality and operation of a possible implementation of the present embodiments. In this regard, each block may represent a module, a segment, or a portion of the program code, which includes one or more executable instructions for implementing specific logical functions or steps in the process. Alternative implementations are included within the scope of the example embodiments of the present invention in which functions may be executed out of order from that shown or discussed, including substantially concurrent or in reverse order, depending on the functionality involved, as would be understood by those reasonably skilled in the art of the present invention.

At step 402, the user can use the trading application 210 to access the spread configuration window 300 of the automatic spreader 216. Using the spread configuration window 300, the user can define the legs of the desired spread and set spread parameters if any. For purposes of illustration, assume that the user defines "leg A" to be the currency product European Euro/US Dollar ("Eur/USD") and "leg B" to be the currency product Japanese Yen/US Dollar ("Yen/USD"). The resulting spread would be "Euro/Yen." It is understood that the trader determines which tradeable object will be associated with each leg and that changing the order could result in a different product. For instance, in the previous example, if the legs had been defined oppositely, the resulting product would be "Yen/Euro" instead.

At step 404, the user can define the market volatility parameter 340 for each leg using the same spread configuration window shown 300 in FIG. 3. Alternatively, the market volatility parameters 340 can be preset for particular tradeable objects. Recall that the market volatility parameter is an estimate of how much each leg market will fluctuate around the last traded price (some other price can be used as a reference instead of the last traded price). Specifically, a leg market that is more volatile might receive a higher market volatility parameter than a leg market that does not fluctuate as often. For example, the market volatility parameter for "leg A" or Eur/USD might be defined by the trader to be a value of "2." The market volatility parameter for "leg B" or Yen/USD, might also be defined as a value of "2." As such, the leg markets are expected to fluctuate the same in this example.

A market volatility parameter of "2" means the price can move "2" price levels above and "2" price levels below the last traded price, resulting in "5" total prices levels for each leg. Likewise, if a market volatility parameter was defined as "4," that would equate to "9" total price levels for the market to fluctuate within. It should also be understood that each leg can be different from each other, and may also be defined as decimal or percentage value, a price, or a derivative of a price.

At step 406, using the received market information and the defined market volatility parameters for leg A and leg B, the trading application 210 can determine the minimum and maximum prices for each leg, which represents the estimated price range each leg might fluctuate in the course of trading. These minimum and maximum prices are used to provide a better estimate of a linear tick increment for the spread and it is understood that the actual leg market may fluctuate beyond the minimum and maximum prices. To determine the minimum and maximum prices for the legs, the trading application either subtracts or adds the corresponding market volatility parameter to or from the last traded price for each leg. For example, if the last traded price for leg A is "1000," then the minimum price is "998" (1000−2) and the maximum price is "1002" (1000+2). Similarly, if the last traded price for leg B is 1000, then the minimum price is "998" and the maximum price is "1002." Of course, it should be understood that the minimum and maximum prices for each leg are only used for further calculations, and any number of price levels can be displayed for each leg.

At step 408, the linear manager 214 utilizes the calculated minimum and maximum prices for each leg from step 406 to determine the minimum and maximum prices for the spread. Again, it is understood that the spread may fluctuate beyond these minimum and maximum prices and that any number of prices can be displayed for the spread. Using the divide spread algorithm, the trading application 210 determines the minimum price for the spread based on the following calculation:

$$\text{Spread Minimum} = \text{Minimum of Leg } A/\text{Maximum of Leg } B$$

$$0.996008 = 998/1002$$

Similarly, the trading application determines the maximum price for the spread based on the following calculation:

$$\text{Spread Maximum} = \text{Maximum of Leg } A/\text{Minimum of Leg } B$$

$$1.004008 = 1002/998$$

At step 410, the trading application 210 may calculate the tick increment for the spread, by first finding the difference between the minimum and maximum prices for the spread calculated in step 408. For example, the difference value may be calculated based on the following calculation:

Difference Value=Spread Maximum−Spread Minimum 0.008=1.004008−0.996008

Using the difference, the trading application 210 determines the tick increment for the spread by dividing the difference value (computed directly above) by the sum of the total market volatility parameter values, which is actually the total number of price levels. As previously described, although the market volatility parameter is defined as "2", the total number of prices levels for that leg is actually "5", because there are 5 different price levels for the leg market to fluctuate. The tick increment calculation is as follows:

Tick Increment=Difference Value/Sum of Total Price Levels 0.0008=0.008/(5+5)

Based on the previous defined calculation, "0.0008" is the linear tick increment between the price levels of the minimum and the maximum spread prices of "0.996008" and "1.004008," respectively.

At step 412, the linear axis manager 214 uses the previously calculated linear tick increment and the minimum and maximum spread prices to generate a linear spread price axis. Beginning at either the minimum or maximum spread price, the linear tick increment is either added (or subtracted) to determine the linear spread price axis. Specifically, the linear tick increment of "0.0008," is either added to the minimum spread price of "0.996008" until the maximum spread price is reached. Alternatively, the linear tick increment of "0.0008" is subtracted from the maximum spread price of "1.004008" until the minimum spread price is reached. For example, determining the prices above the current spread price is based on the following calculation:

spread price 1=minimum spread price+linear tick increment spread price 2=spread price 1+linear tick increment spread price 3=spread price 2+linear tick increment and so on . . . .

For example, the linear spread prices above the minimum spread price would be calculated as follows:

spread price 1: 0.996808=0.996008+0.0008 spread price 2: 0.997608=0.996808+0.0008 spread price 3: 0.998408=0.997608+0.0008

Likewise, determining the prices below the maximum spread price is based on the following calculation:

spread price *A*=maximum spread price−linear tick increment spread price *B*=spread price *A*−linear tick increment spread price *C*=spread price *B*−linear tick increment and so on . . . .

For example, the linear spread price axis below the current spread price would be calculated as follows:

spread price *A*: 1.003208=1.004008−0.0008 spread price *B*: 1.002408=1.003208−0.0008 spread price *C*: 1.001608=1.002408−0.0008

At step 414, using the GUI Manager 218, the calculated linear spread price axis is displayed on a trading screen through the client device 212. The linear spread price axis may provide the trader more ease of use when trading as well as a more predictable spread axis to trade on. Using the conventional spread algorithm and a non-linear spread price axis, the trader is challenged with variably spaced prices and unpredictable price axis where prices may be inserted at any time based on the prices of the legs. However, the trading system described herein is able to overcome the deficiencies of the divide spread and conventionally used spread algorithms.

As will be described in greater detail below, through the GUI Manager 218 and the trading screen, the prices on the linear spread price axis may be different than the actual prices on a non-linear spread axis (if a non-linear spread axis was created). As previously described, the prices along the linear spread axis are approximate and calculated with consistent tick increments. Approximating the prices and placing them at consistent tick increments allows the trader to trade effectively and efficiently.

Figure 5:
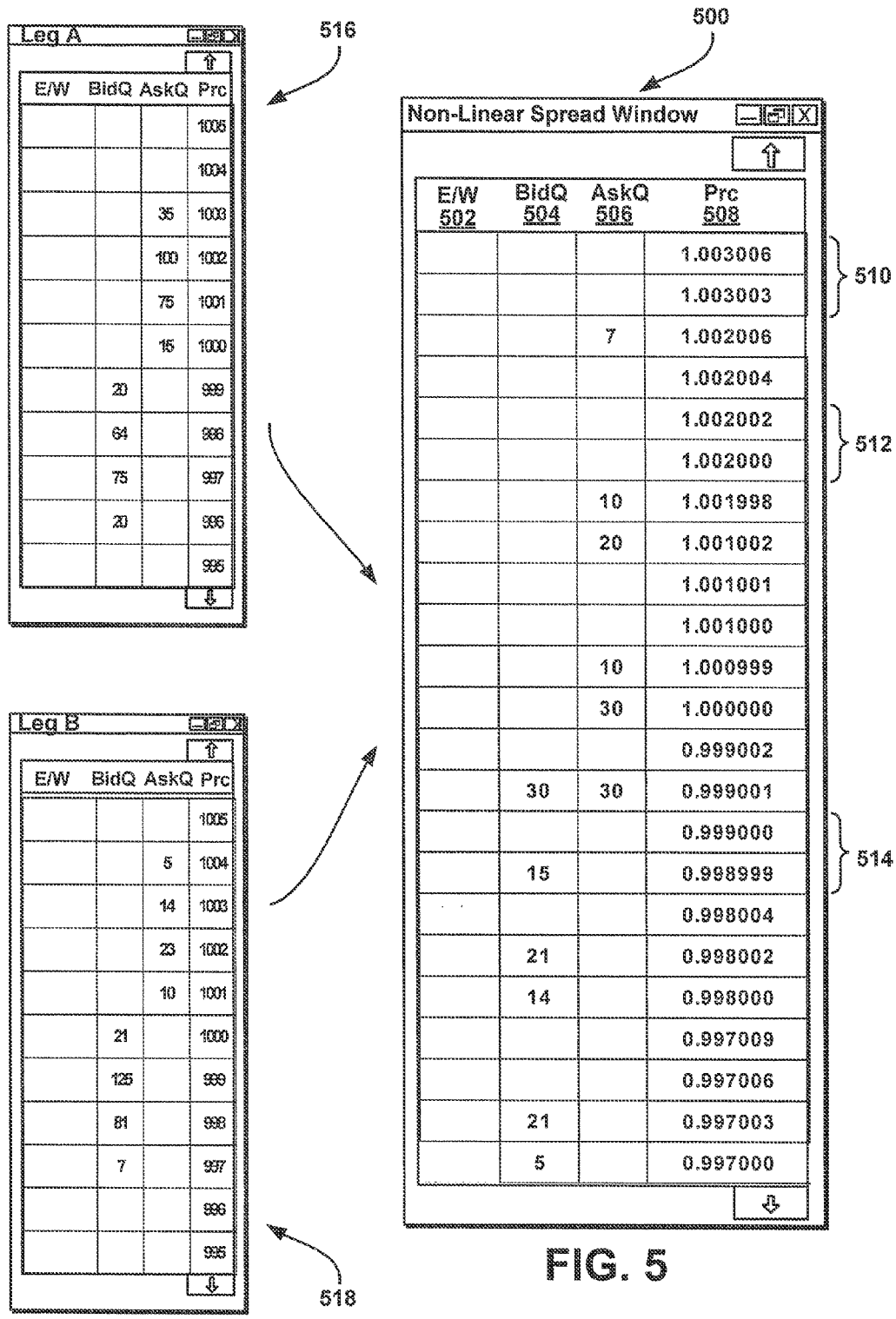
FIG. 5 is a block diagram illustrating an example spread trading screen comprising a non-linear price axis and the linear axis manager disabled.

FIG. 5 is a block diagram illustrating an example spread trading screen comprising a non-linear price axis and the linear axis manager disabled. Specifically, FIG. 5 includes a spread trading screen 500 containing a working quantity column 502, bid quantity column 504, ask quantity column 506, and price column 508. The working quantity column 502 displays desired orders to buy or sell the spread. The bid quantity column 504 displays buy order quantities available in relation to certain price levels in price column 508. The ask quantity column 506 displays offer order quantities available in relation to certain price levels in price column 508. The price column 508 shows price levels in non-linear and variably priced tick increments. FIG. 5 also displays indicators 510, 512, and 514 depicting price levels that have varying and inconsistent tick increments. Along with spread trading screen 500, the trading screens for leg A 516 and leg B 518 are displayed in FIG. 5 and contain the same columns as displayed in trading screen 500.

Using the divide spread algorithm with the linear axis manager disabled, the prices displayed in the price column 508 on trading screen 500, are calculated using the prices from leg A 516 and leg B 518. For example, when leg A 516 is trading at a price of "1000" and leg B 518 is trading at a price of "1000," the spread price is "1.0000" based on the calculation: price of leg A/price of leg B=1000/1000=1.0000. Using the prices shown in leg A 516 and leg B 518, the remaining prices along price column 508 may be calculated using the same algorithm. It should be understood that there are many other price levels that could be displayed along price axis 508 based on all of the possible price combinations in the leg A and leg B. However, for the sake of illustration, the number of price levels displayed has been limited to ensure that the non-linear tick increments are understood.

As the prices in the legs fluctuate, trading may occur at many different prices. Each combination of certain prices in the legs equates to a different calculated spread price. Often a new combination of prices in the legs, will determine a spread price that did not previously exist along price column 508. The new price is then counter-intuitively inserted into the price column 508. Not only is this very confusing for a trader, but it also increases the challenges of trading on a non-linear price axis. For example, if leg A 516 is at a price level of 1003 and leg B 516 is at a price level of "1002," the price of "1.000998" would need to be inserted between the price of "1.000000" and "1.000999" along the price column 508.

At indicator 510 on trading screen 500, the price column 508 indicates two prices levels, "1.003006" and "1.003003." The two price levels have a tick increment of "0.000003," meaning the difference in value between the two price levels is "0.000003." Intuitively, the trader would think that all the price levels on trading screen 500 would have the same increment. However, at indicator 512 the tick increment between the two price levels is much larger than the tick increment at indicator 510. Indicator 512, indicates a tick increment of "0.001000," where the value between level "1.002002" and "1.002000" are separated by a value of "0.000002." The inconsistencies of the price column 508 continue when looking at indicator 514. Price level "0.998999" and price level "0.998004" have a tick increment of "0.000995" between them.

Trading screen 500 presents deficiencies of the divide spread algorithm. Although trading screen 500 contains a price axis on which a trader could possibly trade, with inconsistent tick increments and a non-linear price axis, trading may be challenging and difficult. Viewing the price axis 508 in a linear format with consistent tick increments allows for more effective, efficient, and intuitive trading. According the example embodiments, a linear price axis may be calculated and trading can be simplified.

Just as the spread prices in price column 508 are calculated using the prices from leg A and leg B, the spread quantities are also calculated using the quantities from leg A and leg B. The method used to calculate the quantities is known as bid-to-bid and ask-to-ask and consists of comparing the best bid to the bid depth and the best ask to the ask depth from each leg, respectively. However it should be understood that there are a variety of methods for determining spread prices and quantities, for example another commonly used method is known as bid-to-ask. Using the bid-to-bid and ask-to-ask method is preferred in this example as it results in higher chance of the offsetting order getting filled at the best bid/ask price, whereas when using the bid-to-ask method if the offsetting order might not get filled as quickly.

In general, the automated trading tool will calculate the bid prices for the spread, by first comparing the best bid in leg B to the bid depth of leg A. It will take the minimum quantity between the current two prices being compared and will map that quantity to the corresponding spread price. Then the automated trading tool will compare the best ask in leg A to the ask depth of leg B. Similarly, the quantities between the two prices are compared, and the minimum quantity is mapped to the corresponding spread price. To calculate the ask prices for the spread, the automated trading tool compares the best ask of leg B to the ask depth of leg A. Finally, the best bid of leg A is compared to the bid depth of leg B, to complete the prices on the ask side of the spread. As previously described, the corresponding quantities are compared and the minimum quantity between the two sets of prices is mapped to the corresponding ask spread price.

For example, to calculate the quantities associated with the spread bid prices in price column 508, the automated spread trading tool first compares the best bid of leg B at a price of "1000" against the bid depth of leg A at the prices of "999," "998," "997," and "996." To calculate quantities, first the best bid quantity in leg B at a price of "1000" is compared to the best bid quantity in leg A at a price of "999." Since there is less quantity available at the best bid price in leg B, quantity of "20," than in leg A, quantity of "21," the trading system recognizes that "20" is the minimum quantity. A quantity of "20" is then associated with the corresponding spread price of "0.999000"=999/1000 or spread price=leg A/leg B.

To continue calculating the spread quantities, the automated spread trading tool looks to the next quantity in the bid depth in leg A. Using the method described above, the trading system compares the best bid in leg B with a quantity of "21," to the bid quantity of "64," at price "998" in leg A. Since the quantity in leg B is less than the quantity in leg A, the quantity from leg B is associated with the spread price of "0.998000"=998/1000.

To calculate the remaining bid quantities for the spread, the automated trading tool moves to the next step of comparing the best ask in leg A to the ask depth of leg B. Specifically, the best ask of leg A is at a price of "1000" is compared to the ask depth of leg B at a prices of "1001," "1002," "1003," and "1004." First the best ask quantity of leg A at a price of "1000" is compared to the best ask quantity of leg B at a price of "1001." Since there is less quantity available at the best bid price in leg B, quantity of "10", than in leg A, quantity of "15," the trading system recognizes that "10" is the minimum quantity. Thus, a quantity of "10" is associated with the corresponding spread price of "0.999001." The previously described calculations are continued for all of the ask depth in leg B. Once completed, the quantities associated with the bid side of the spread market will be calculated and mapped to the corresponding spread price.

Further, to calculated the spread quantities on the ask side of the market the automated trading tool first compares the best ask of leg B to the ask depth of leg A. For example, the best ask in leg B at a price of "1001" is compared to the best ask in leg A at a price of "1000." Since there is less quantity available at the best ask price in leg B, quantity of "10," than in leg A, quantity of "15," the trading system recognizes that "10" is the minimum quantity. Thus, a quantity of '10" is associated with the corresponding spread price of "0.999001"=1000/1001. The previously described calculations are continued for the remaining ask depth in leg A.

To finish calculating the remaining ask quantities for the spread, the best bid of leg A is compared to the bid depth of leg B. Specifically, the best bid quantity of leg A at a price of "999" is compared to the best bid quantity of leg B at a price of "1000." Since there is less quantity available at the best bid price in leg A, quantity of "20", than in leg B, quantity of "21," the trading system recognizes that "20" is the minimum quantity. Thus, a quantity of "20" is associated with the corresponding spread price of "0.999000." However, since a quantity of "20" has already been associated with the spread price of "0.999000," the system does not assign an additional "20," as there are still only a maximum of "20" available to sell, not "40." The previously described calculations are continued for the remaining bid depth in leg B. Once completed, the quantities associated with the ask side of the market will be calculated and mapped to the corresponding spread price.

A more detailed description regarding how to calculate a spread quantity can be found in already incorporated application U.S. patent application Ser. No. 10/137,979, entitled, "System and Method for Performing Automatic Spread Trading," filed on May 3, 2002 and U.S. patent application Ser. No. 10/403,333, entitled, "System and Method for Variably Regulating Automatic Order Entry in an Electronic Trading Environment," filed on Mar. 31, 2003.

Figure 6:
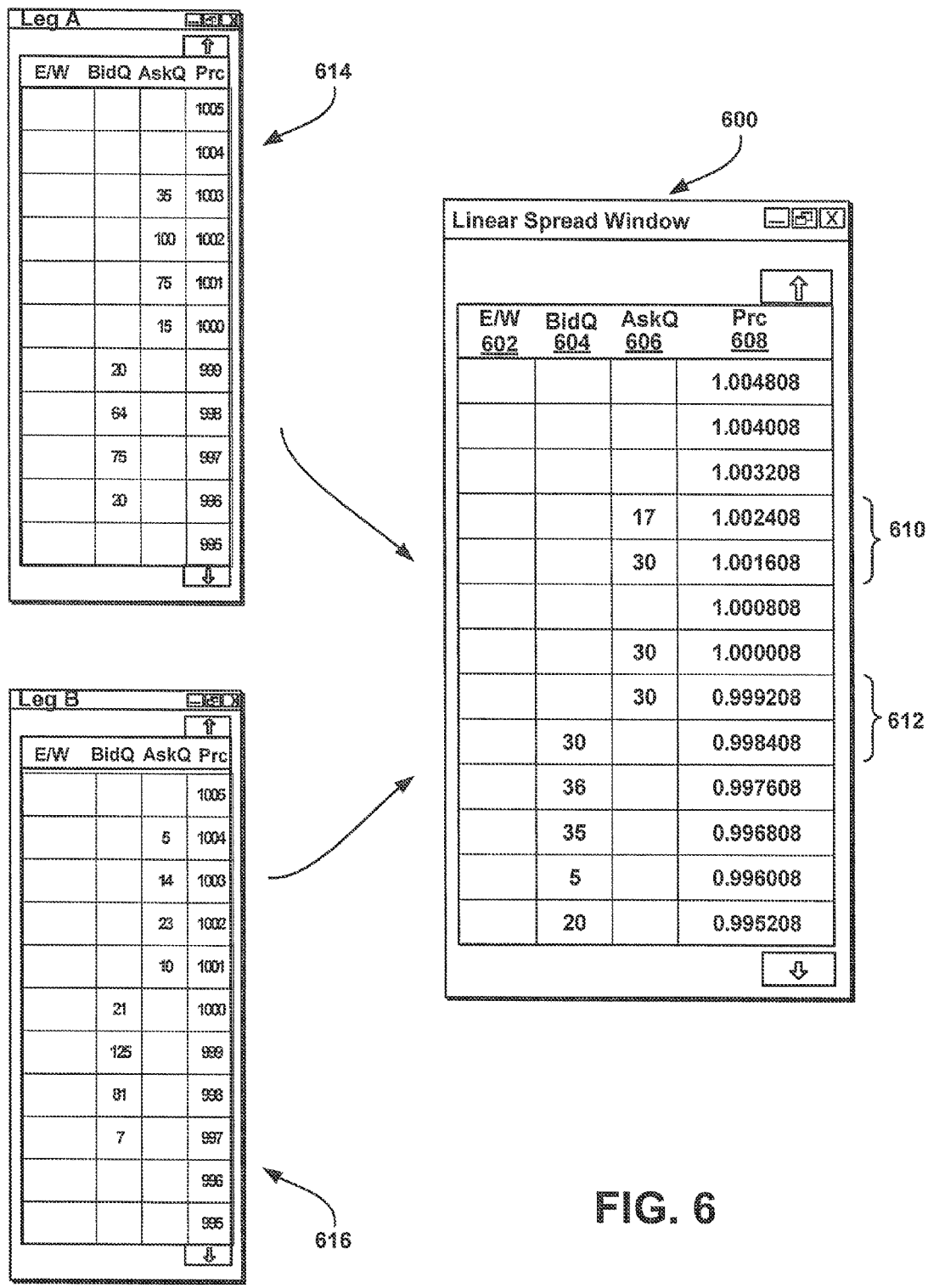
FIG. 6 is a block diagram illustrating an example spread trading screen comprising a linear price axis and the linear axis manager enabled.

FIG. 6 is a block diagram illustrating an example spread trading screen comprising a linear price axis and the linear axis manager enabled. Specifically, FIG. 6 includes a spread trading screen 600 containing a working quantity column 602, bid quantity column 604, ask quantity column 606, and price column 608. The working quantity column 602 displays desired orders to buy or sell the spread. The bid quantity column 604 displays buy order quantities available in relation to certain price levels in price column 608. The ask quantity column 606 displays offer order quantities available in relation to certain price levels in price column 608. The price column 608 shows price levels in linear and consistently priced tick increments. FIG. 6 also displays indicators 610 and 612 depicting some of the price levels that have consistent tick increments. As well as spread trading screen 600, the trading screens for Leg A 614 and Leg B 616 are displayed and contain the same columns as displayed in trading screen 600.

According to the example embodiments, the prices along the linear price axis, price column 608, are calculated using the example method described with reference to FIG. 4. It should be understood that the inputs used in reference to FIG. 4 are also used in the following examples. After defining the legs of the spread, leg A 614 and leg B 616, the trader can enable the linear axis manager 214 and define the market volatility parameters 340. The market volatility parameters can be associated with each leg A 614 and leg B 616 through the spread configuration window 300 in FIG. 3. The trading application receives market information corresponding to leg A 614 and leg B 616 from the electronic exchange. Using the received market information, the trading application may calculate the minimum and maximum price for each leg.

Based on the calculated minimum and maximum prices for leg A 614 and leg B 616, the minimum and maximum prices for the spread 600 may also be calculated. Similar to the minimum and maximum prices for the legs, the minimum and maximum prices for the spread, determine an approximate range of prices that the spread market might fluctuate within during a specific trading session. The minimum and maximum spread prices are "0.996008" and "1.004008," respectively. To determine the linear tick increment, the trading application takes the difference between the maximum and minimum spread prices and divides the result by the total sum of the market volatility parameters. As previously described, although the market volatility parameter for each leg was defined as "2", the trading application actually relates it to a total of "5" price levels; "2" price levels above the last traded price, the last traded price, and "2" levels below the last traded price. To determine the linear tick increment the following calculation would be used:

Linear tick increment=(1.004008−0.996008)/(5+5)

Linear tick increment=0.0008

The calculated linear tick increment is further used to determine the approximate prices to be displayed on the linear spread price axis, price column 608. Starting with the minimum or maximum spread price, the trading application continuously adds or subtracts the linear tick increment. For example, if the trading application starts at the maximum spread price, the trading application would subtract "0.0008" from "1.004008" and so on, until the minimum spread price of "0.996008" is reached. The calculated approximate prices for the spread make up the linear spread price axis, displayed at price column 608. As previously described, the minimum and maximum spread prices are calculated for use in determining the linear spread axis. Of course, once the tick increment is determined, any number of price levels can be displayed for the spread, and the number of price levels displayed is not limited to the number of price levels between the minimum and the maximum spread prices. Any number of prices levels could be displayed on price column 608.

As an alternative embodiment, the trading application could first calculate a median spread price and then determine the approximate prices to be displayed on the linear spread axis. Specifically, the trading application could use the last traded price for leg A and leg B to determine the median spread price. From the median spread price, the trading application could add or subtract the linear tick increment to determine the prices along the spread price axis.

As displayed in spread trading screen 600 in FIG. 6, a linear spread price axis has been determined and the linear tick increment is indicated at indicators 610 and 612. Indicator 610 references two price levels, "1.002408" and "1.001608," where the difference between the two price levels is "0.0008." Similarly, at indicator 612, the difference between price levels "0.999208" and "0.998408" is also "0.0008." As can be seen in price column 608, the linear tick increment between all of the price levels is "0.0008."

According to the example embodiments, the trader will notice that the linear spread price axis, price column 608, does not necessarily display the same spread prices as shown in FIG. 5, but instead approximate spread prices separated by linear tick increments. As seen on price column 508 in FIG. 5, when the spread prices are displayed, the price axis is non-linear with inconsistent tick increments. Referring back to FIG. 6, using approximate spread prices, the price axis is linear with consistent tick increments between each price level.

As an alternative embodiment, the trading application may provide the means for the trader to manually override some of the calculated prices used to determine the linear spread price axis. Specifically, the minimum and maximum spread prices as well as the linear tick increment may be defined by the trader. Manually overriding is a useful mechanism, as it allows the trader to determine the precision of the approximate linear spread axis.

The trading screen 600 illustrated in FIG. 6 can also be used as an order entry tool. In other words, a trader can set a desired price and quantity for the spread (or trading strategy) by placing an "order" on the screen and the computer will automatically manage orders in the legs to achieve the desired price. U.S. patent application Ser. No. 10/137,979, entitled, "System and Method for Performing Automatic Spread Trading," filed on May 3, 2002, which has already been incorporated by reference discloses these concepts. The present application builds on those concepts and adapts them for use with the linear spread axis generated herein; an example is illustrated directly below where the spread is defined as buying in leg A and selling in leg B. Of course, these teachings can be applied by one of ordinary skill to any defined spread or trading strategy.

Accordingly, when a trader sets a desired spread price by placing an order on the linear spread price axis, the trading system automatically places a buy order in the leg A based on market information leg B. It should be understood that a spread order in this context is really a synthetic one, which is not actually sent to an exchange; rather orders are placed in the legs of the spread to achieve the parameters of the spread order, like price and quantity of the spread. It should be understood that the spread could also be defined as selling in leg A and buying in leg B, and that any number of legs could be associated with a given trading strategy.

The trader places an order to buy the spread at "0.998408" on price column 608. The trading application determines the current best bid price in leg B 616 is at a price level of "1000." To achieve the approximate linear spread price of "0.998408," an order to buy leg A must be placed at "998" (e.g., 998 is rounded down from 998.408=1000*0.998408). It should be understood that even though the prices are different, the difference is small enough to be acceptable to the trader. Now, if the order to buy leg A gets filled, then the trading tool will send an offsetting order to sell leg B at "1000." Notice that the actual spread price achieved would be "0.998" (and not the desired price of 0.998408), because of the linear approximations made in generating the linear axis (e.g., due to the rounding down). According to the example embodiments, the prices and quantities on the bid side of the market are rounded down and the prices and quantities of the ask side of the market are rounded up. It should be understood that any method of rounding could be used. For example, the trading system could round all prices and quantities up or all prices and quantities down.

If the trader places a order to buy the spread at a price level of "0.998048" on the approximate linear spread price axis, and the price of leg B 614 moved up to the price level of "1001," the trading application would determine that the order to buy in leg A 616 should be re-priced to "999" (e.g., 999 is rounded down from 999.406408=1001*0.998408), unless the concepts of slop are applied. Slop is an input that allows some defined amount of market movement to occur in leg B, before the order in leg A is re-priced to maintain the desired spread price. The concept of slop is described in U.S. patent application Ser. No. 10/137,979, entitled, "System and Method for Performing Automatic Spread Trading," filed on May 3, 2002, which has already been incorporated by reference. If this trading strategy is executed, the order to buy in leg A is filled and the order to sell in leg B is filled at these prices, and the actual achieved spread price would be "0.998001" (0.998001=999/1001).

According to the previously described example embodiments, prices along a linear spread axis are approximate and represent a group of prices from the non-linear price column 508. Likewise, the spread quantities also represent the quantities associated with the group of spread prices from price column 508. The trading application determines which approximate spread price to associate with a price from price column 508 with by rounding prices and quantities on the bid side of the market down and prices and quantities on the ask side of the market up. According to the example embodiments, the price "0.999002" with a quantity of "0" and price "0.999001" with a quantity of "30", are both rounded down to be grouped together within the linear spread price of "0.998408" with a quantity of "30" along price column 608. Specifically, the prices "0.999002" and "0.999001" are rounded down to the next approximate linear price of "0.998404" and the quantities of "30" and "0" are combined to determine the spread quantity of "30."

Similarly, according to the example embodiments, the price "1.002006" with a quantity of "7," price "1.002004" with a quantity of "0," price "1.002002" with a quantity of "0," and price "1.001998" with a quantity of "10" are rounded up and grouped together within the linear spread price of "1.002408" with a quantity of "17" from spread window 600. Specifically, the prices "1.002006," "1.002004," "1.002002," and "1.001998" are rounded up to the next approximate linear price of "1.002408." The quantities of "7," "0," "0," and "10" are combined to determine the spread quantity of "17." The remaining spread quantities associated with the linear prices in price column 608 are calculated using the same method as previously described.

CONCLUSION

The example embodiments discussed above describe a trading application that determines a linear spread price axis. To determine the linear spread price axis according to one example embodiment, the trading application allows a trader to define market volatility parameters corresponding to each leg of a spread. Once the market volatility parameters are defined, the trading application utilizes the received market information and the divide spread algorithm to determine a linear tick increment. The linear tick increment is further used to determine the complete linear spread price axis for the trader to place spread orders on.

Along with being able to trade more effectively and efficiently, the trader is relieved of the hassle of trying to determine the tick increment between the prices found on a non-linear price axis. A trader will be able to focus their attention on market conditions, placing new spread orders, and managing their existing spread orders instead of attempting to comprehend the inconsistent non-linear price axis.

The above description of the example embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

It will be apparent to those of ordinary skill in the art that methods involved in the system and method for dynamically determining quantity for risk management may be embodied in a computer program product that includes one or more computer readable media. For example, a computer readable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A method including:
   determining by a computing device a minimum leg price and a maximum leg price for each leg of a trading strategy based on a market volatility parameter for the leg, wherein the trading strategy defines a relationship between a plurality of tradeable objects, wherein each tradeable object is a leg of the trading strategy, wherein the trading strategy has non-linear tick increments based on the defined relationship;
   determining by the computing device a minimum strategy price and a maximum strategy price for the trading strategy based on the minimum leg price and the maximum leg price for each leg of the trading strategy;
   determining by the computing device a linear tick increment for the trading strategy based on the minimum strategy price, the maximum strategy price, and the market volatility parameters for each leg of the trading strategy; and
   generating by the computing device a linear price axis for the trading strategy based on the linear tick increment, the minimum strategy price, and the maximum strategy price, wherein the linear price axis includes a plurality of price levels, wherein each price level corresponds to a price for the trading strategy with a consistent interval between price levels.

2. The method of claim 1, wherein the defined relationship of the trading strategy is a divide spread relationship.

3. The method of claim 1, wherein the defined relationship of the trading strategy is a multiply spread relationship.

4. The method of claim 1, wherein the minimum leg price for a leg of the trading strategy is determined by subtracting the market volatility parameter for the leg from a last traded price for the tradeable object of the leg, wherein the maximum leg price for the leg of the trading strategy is determined by adding the market volatility parameter for the leg to the last traded price for the tradeable object of the leg.

5. The method of claim 1, wherein the market volatility parameter for a leg of the trading strategy is user-defined.

6. The method of claim 1, wherein the market volatility parameter for a leg of the trading strategy is preset.

7. The method of claim 1, wherein the market volatility parameters for each leg of the trading strategy are different values.

8. The method of claim 1, wherein determining the minimum strategy price for the trading strategy includes diving a minimum leg price for a first leg by a maximum leg price for a second leg, wherein determining the maximum strategy price for the trading strategy includes dividing a maximum leg price for the first leg by a minimum leg price for the second leg.

9. The method of claim 1, wherein determining the minimum strategy price for the trading strategy includes multiplying a minimum leg price for a first leg by a maximum leg price for a second leg, wherein determining the maximum strategy price for the trading strategy includes multiplying a maximum leg price for the first leg by a minimum leg price for the second leg.

10. The method of claim 1, wherein at least one of the minimum strategy price and the maximum strategy price for the trading strategy is manually overridden.

11. The method of claim 1, wherein the linear tick increment for the trading strategy is determined by dividing a difference value by the sum of the market volatility parameters for each leg of the trading strategy, wherein the difference value is determined by subtracting the minimum strategy price from the maximum strategy price.

12. The method of claim 1, wherein the linear price axis for the trading strategy is generated by starting with the minimum strategy price and iteratively incrementing by the linear tick increment to determine the plurality of price levels.

13. The method of claim 1, wherein the linear price axis for the trading strategy is generated by starting with the maximum strategy price and iteratively decrementing by the linear tick increment to determine the plurality of price levels.

14. The method of claim 1, further including:
mapping by the computing device a quantity for the trading strategy at a particular price to a price level of the linear price axis.

15. The method of claim 14, wherein the particular price of the quantity is rounded to the nearest price level of the linear price axis.

16. The method of claim 1, further including:
displaying by the computing device the linear price axis for the trading strategy.

17. The method of claim 16, further including:
dynamically displaying by the computing device a first indicator in relation to a first price level of the linear price axis, the first indicator being associated with a highest bid price for the trading strategy; and
dynamically displaying by the computing device a second indicator in relation to a second price level of the linear price axis, the second indicator being associated with a lowest ask price for the trading strategy.

18. The method of claim 16, further including:
receiving by the computing device a command to place a strategy order at a selected price along the linear price axis;
determining by the computing device an order price for the strategy order based on the selected price and the defined relationship; and
initiating by the computing device placement of the strategy order at the order price.

* * * * *